US012779941B2

(12) United States Patent
Lee

(10) Patent No.: US 12,779,941 B2
(45) Date of Patent: Nov. 3, 2026

(54) SYSTEM FOR MEASURING ODOR FROM AIR CONDITIONER OF VEHICLE AND METHOD FOR MEASURING ODOR FROM AIR CONDITIONER USING SAME

(71) Applicants: HYUNDAI MOTOR COMPANY, Seoul (KR); KIA CORPORATION, Seoul (KR)

(72) Inventor: Tae Hee Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/063,825

(22) Filed: Feb. 26, 2025

(65) Prior Publication Data

US 2026/0042334 A1 Feb. 12, 2026

(30) Foreign Application Priority Data

Aug. 7, 2024 (KR) ........................ 10-2024-0105048

(51) Int. Cl.
*B60H 1/00* (2006.01)
*B60H 3/00* (2006.01)
*G07C 5/08* (2006.01)
*B60H 3/06* (2006.01)

(52) U.S. Cl.
CPC ......... *B60H 1/008* (2013.01); *B60H 1/00985* (2013.01); *B60H 3/0092* (2013.01); *G07C 5/0825* (2013.01); *B60H 2003/0683* (2013.01)

(58) Field of Classification Search
CPC .................................................. B60H 1/00985
See application file for complete search history.

(56) References Cited

U.S. PATENT DOCUMENTS

| | | | | |
|---|---|---|---|---|
| 5,983,659 A * | 11/1999 | Lemaitre | F24F 13/22 | 62/89 |
| 6,488,635 B1 * | 12/2002 | Mottram | A61B 5/097 | 119/14.01 |
| 2007/0125520 A1 * | 6/2007 | Nutsos | F28G 9/00 | 165/41 |
| 2007/0157819 A1 * | 7/2007 | Kang | B01D 46/46 | 96/417 |
| 2007/0227358 A1 | 10/2007 | Takigawa et al. | | |
| 2012/0221198 A1 * | 8/2012 | Kohavi | B60H 1/00849 | 62/318 |

(Continued)

FOREIGN PATENT DOCUMENTS

| | | |
|---|---|---|
| DE | 102004041377 A1 | 3/2005 |
| DE | 102022131198 A1 | 7/2023 |

(Continued)

*Primary Examiner* — Jess Whittington
(74) *Attorney, Agent, or Firm* — MCDONNELL BOEHNEN HULBERT & BERGHOFF LLP

(57) ABSTRACT

A system and method for measuring odor from an air conditioner of a vehicle which are able to accurately measure air conditioner odor that varies in each operation mode of the air conditioner. The system and method enable accurate measurement of air conditioner odor that varies in each of operating modes of air conditioner such as a blower-on step, an air conditioner-on step, and an air conditioner-off step, and enable accurate examination and measures for an air-conditioning system on the basis of the measured result.

16 Claims, 3 Drawing Sheets

(56) References Cited

U.S. PATENT DOCUMENTS

| | | | | |
|---|---|---|---|---|
| 2016/0168527 | A1* | 6/2016 | Lee | C12M 41/34<br>435/303.1 |
| 2017/0210353 | A1* | 7/2017 | Stauffer | B60S 1/64 |
| 2019/0126202 | A1* | 5/2019 | Rao | B01D 53/885 |
| 2019/0160907 | A1* | 5/2019 | Velazquez | B60H 1/248 |
| 2019/0193528 | A1* | 6/2019 | Hattori | B60H 3/06 |
| 2019/0366809 | A1* | 12/2019 | Fernandes | B60R 25/01 |
| 2020/0009503 | A1* | 1/2020 | Bender | B01D 53/32 |
| 2020/0179858 | A1* | 6/2020 | Marra | B01D 46/44 |
| 2020/0207298 | A1* | 7/2020 | Wensley | B60H 1/008 |
| 2020/0369125 | A1* | 11/2020 | Ishiko | B60H 3/0085 |
| 2021/0031730 | A1* | 2/2021 | Nakano | G06Q 10/20 |
| 2021/0053550 | A1* | 2/2021 | Kim | B60H 1/12 |
| 2021/0372942 | A1* | 12/2021 | Park | G01N 21/94 |
| 2021/0403019 | A1* | 12/2021 | Kim | B60H 1/00742 |
| 2022/0005112 | A1* | 1/2022 | Woo | G06Q 30/0207 |
| 2022/0011242 | A1* | 1/2022 | Woo | G06V 20/59 |
| 2022/0033245 | A1* | 2/2022 | Jost | G01N 33/0073 |
| 2022/0036720 | A1* | 2/2022 | Woo | H04N 23/60 |
| 2022/0089087 | A1* | 3/2022 | Ishiko | B60H 3/0085 |
| 2023/0226883 | A1* | 7/2023 | Lee | B60H 1/008<br>454/75 |
| 2023/0266032 | A1* | 8/2023 | Bender | F24F 11/63<br>700/276 |
| 2023/0266299 | A1* | 8/2023 | Apell | B62D 1/04 |
| 2024/0246386 | A1* | 7/2024 | Park | B60H 1/00028 |
| 2024/0358877 | A1* | 10/2024 | Ng | A61L 9/12 |
| 2025/0332974 | A1* | 10/2025 | Oya | B60N 2/90 |

FOREIGN PATENT DOCUMENTS

| | | | |
|---|---|---|---|
| JP | 2014-125121 | A | 7/2014 |
| JP | 2019-113253 | B2 | 7/2019 |
| JP | 2019-209827 | A | 12/2019 |
| JP | 2020-189599 | A | 11/2020 |
| JP | 2021-137331 | A | 9/2021 |
| KR | 2014-0112689 | A | 9/2014 |
| KR | 2016-0024066 | B1 | 3/2016 |
| KR | 10-1730425 | B1 | 4/2017 |

* cited by examiner

SYSTEM FOR MEASURING ODOR FROM AIR CONDITIONER OF VEHICLE AND METHOD FOR MEASURING ODOR FROM AIR CONDITIONER USING SAME

CROSS REFERENCE TO RELATED APPLICATIONS

The present application claims priority to Korean Patent Applications No. 10-2024-0105048, filed Aug. 7, 2024, the entire contents of which are incorporated herein for all purposes by this reference.

BACKGROUND

Technical Field

The present disclosure relates to a system and method for measuring odor from an air-conditioner of a vehicle. In more detail, the present disclosure relates to a system for measuring odor from an air conditioner of a vehicle and a method for measuring odor from an air-conditioner of a vehicle using the system, the system being able to accurately measure the odor from an air conditioner that changes in accordance with operation modes of the air conditioner, and a method for measuring odor from an air conditioner of a vehicle using the system.

Description of the Related Art

Automatic air-conditioning system, that is, a Heating, Ventilation and Air Conditioning (HVAC) system is manufacture in a structure in which an evaporator core, a heater core, etc. mounted in an air-conditioning case are modularized, and is usually installed inside a crush pad constituting a cockpit module.

Cold air that has passed through the evaporator core is supplied to the interior, whereby interior cooling can be achieved, and hot air that has passed through the heater core is supplied to the interior, whereby interior heating can be achieved, and condensate may be produced on the surface of the evaporator core during interior cooling.

The condensate produced on the evaporator core due to the operation of the air conditioner of the air-conditioning system has been known as a cause of propagation of bacteria and mold and has been known as a main factor that causes unpleasant odor from the air conditioner.

Accordingly, as a method for removing the odor from the air conditioner of vehicles in the related art, a method of changing an air conditioner filter or drying the moisture on the surface of an evaporator by further operation a blowing fan for a predetermined time after stopping an air conditioner is applied.

However, the method of drying an evaporator core by further operating a blowing fan for a predetermined time after stopping an air conditioner regardless of the fact that the concentration of the odor from an air conditioner changes in accordance with the operation modes of the air conditioner is accompanied with the problem that not only it is difficult to basically solve the problem of the odor from an air conditioner, but users receive unnecessary examination and maintenance for an air conditioning system by misunderstanding unpleasant odor that is generated inside and outside a vehicle as the odor from the air conditioner.

Accordingly, it would be preferable to accurately measure the concentration of the odor from an air conditioner that changes in accordance with the operation mode of the air conditioner and then accurately inspect an air-conditioning system and take accurate measures on the basis of the measured result.

SUMMARY

The present disclosure has been made in an effort to solve the problems in the related art described above and an objective of the present disclosure is to provide a system and method for measuring odor from an air conditioner of a vehicle, the system and method being able to accurately measure odor from an air conditioner that changes in accordance with the operation modes of the air conditioner, such as a blower-on step, an air conditioner-on step, and an air conditioner-off step, and being able to enable accurate examination and measures for an air-conditioning system on the basis of the measured result.

In order to achieve the objectives, an embodiment of the present disclosure provides a system for measuring odor from an air conditioner of a vehicle, the system including an odor measurer connected to an air-conditioning system and configured to measure air conditioner odor that varies in each operation mode of the air conditioner, a controller configured to compare maximum concentration of air conditioner odor in each of the operation modes of the air conditioner with reference concentration based on measurement signals of the odor measurer, and to determine different examination items of the air conditioner for each of the operation modes of the air conditioner when the maximum concentration of air conditioner odor in each of the operation modes of the air conditioner is over the reference concentration, and a display configured to display examination items of the air conditioner determined by the controller.

The controller may compare first maximum concentration of air conditioner odor measured for a predetermined time from a blower-on time point by the odor measurer with first reference concentration, and determine replacement of an air conditioner filter from the examination items of the air conditioner and control the display to display notification for replacing the air conditioner filter when the first maximum concentration is over the first reference concentration.

The controller may compare second maximum concentration of air conditioner odor measured for a predetermined time from an air conditioner-on time point by the odor measurer with second reference concentration, and determine washing of an evaporator core from the examination items of the air conditioner and control the display to display notification for washing the evaporator core when the second maximum concentration is over the second reference concentration.

The controller may compare third maximum concentration of air conditioner odor measured for a predetermined time from an air conditioner-off time point by the odor measurer with third reference concentration, and determine cleaning of an air conditioner duct and an interior from the examination items of the air conditioner and control the display to display notification for cleaning the air conditioner duct and the interior when the third maximum concentration is over the third reference concentration.

The odor measurer includes a pre-chamber, an air intake line connected between a first side of the pre-chamber and the duct; an air flow line having a first end connected with the air intake line and a second end connected to a second side of the pre-chamber, and disposed across an inside of the pre-chamber, a valve mounted on the air intake line and configured to be opened and closed in accordance with control signals from the controller, an odor sensor mounted in the odor sensor chamber and configured to measure air conditioner odor that is suctioned through the air intake line and the air flow line, a connecting pipe connected between an inlet of the odor sensor chamber and the air flow line; and a suction pump connected to an outlet pipe of the odor sensor chamber.

The pre-chamber may be equipped with a first heater controlled to be turned on/off by the controller in order to heat air passing through the air flow line and a first cooler that is controlled to be turned on/off by the controller in order cool the air passing through the air flow line.

The odor sensor chamber may be equipped with a second heater controlled to be turned on/off by the controller in order to heat an inside of the odor sensor chamber and a second cooler controlled to be turned on/off by the controller in order to cool the inside of the odor sensor chamber.

In order to achieve the objectives, an embodiment of the present disclosure provides a method for measuring odor from an air conditioner of a vehicle, the method including measuring air conditioner odor that varies in each operation mode of the air conditioner by means of an odor measurer connected to a duct of an air-conditioning system, comparing maximum concentration of air conditioner odor in each of the operation modes of the air conditioner with reference concentration based on measurement signals of the odor measurer by means of a controller, determining different examination items of the air conditioner for each of the operation modes of the air conditioner by means of the controller when the maximum concentration of air conditioner odor in each of the operation modes of the air conditioner is over the reference concentration, and displaying determined examination items of the air conditioner by control of the controller.

The measuring of air conditioner odor may include measuring air conditioner odor for a predetermined time from a blower-on time point, measuring air conditioner odor for a predetermined time from an air conditioner-on time point, and measuring air conditioner odor for a predetermined time from an air conditioner-off time point.

In the determining of examination items of the air conditioner, when first maximum concentration of air conditioner odor measured for a predetermined time from a blower-on time point by the odor measurer is over first reference concentration, the controller may determine replacement of an air conditioner filter from the examination items of the air conditioner.

Notification for replacing the air conditioner filter may be displayed on the display by control of the controller.

In the determining of examination items of the air conditioner, when second maximum concentration of air conditioner odor measured for a predetermined time from an air conditioner-on time point by the odor measurer is over second reference concentration, the controller may determine washing of an evaporator core from the examination items of the air conditioner.

Notification for washing the evaporator core may be displayed on the display by control of the controller.

In the determining of examination items of the air conditioner, when third maximum concentration of air conditioner odor measured for a predetermined time from an air conditioner-off time point by the odor measurer is over third reference concentration, the controller determines cleaning of an air conditioner duct and an interior from the examination items of the air conditioner.

Notification for cleaning the air conditioner duct and the interior may be displayed on the display by control of the controller.

The present disclosure provides the following effects through the objectives described above.

First, it is possible to accurately examine an air-conditioning system and take measures on the basis of a measurement result by measuring air conditioner odor in each of the operation modes of the air conditioner including a blower-on step, an air conditioner-on step, and an air conditioner-off step, etc., and accordingly, it is possible to prevent unnecessary and inaccurate examination and maintenance of an air-conditioning system in the related art.

Second it is possible to accurately examine an air-conditioning system and take accurate measures by accurately determining whether air conditioner odor is produced in vehicles of which drivers are not specified such as an autonomous vehicle or a shared vehicle, and accordingly, it is possible to improve convenience of managing air conditioner odor of future mobility vehicles.

DETAILED DESCRIPTION

Figure 1:
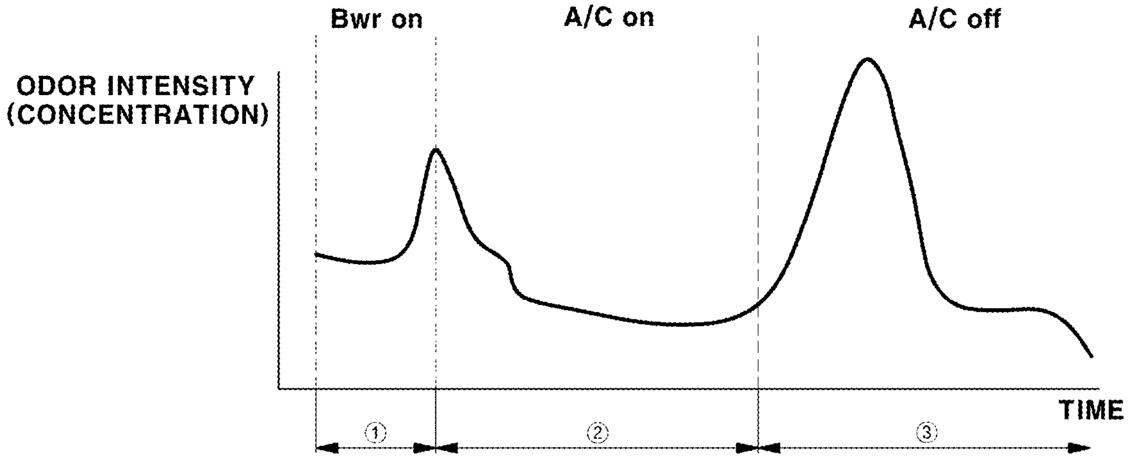
FIG. 1 is a graph showing a concentration pattern of odor from an air conditioner of a vehicle.

Description of specific structures and functions disclosed in embodiments of the present disclosure is only an example for describing the embodiments according to the concept of the present disclosure and the embodiments according to the concept of the present disclosure may be implemented in various ways. The present disclosure is not limited to the embodiments described herein and should be construed as including all changes, equivalents, and replacements that are included in the spirit and the range of the present disclosure.

It will be understood that, although the terms first and/or second, etc. may be used herein to describe various elements, these elements should not be limited by these terms. These terms are used only to distinguish one element from another element. For instance, a first element discussed below could be termed a second element without departing from the right range of the present disclosure. Similarly, the second element could also be termed the first element.

It is to be understood in the specification that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

Hereinafter, exemplary embodiments of the present disclosure will be described in detail with reference to the accompanying drawings.

In general, the operation mode of an air conditioner includes a mode of blowing external air to an interior by turning on a blower, a mode of blowing cold air that has passed through an evaporator core to the interior by turning on the air conditioner, a mode of keeping the blower on for a predetermined time to dry the evaporator core by turning off the air conditioner, etc.

Referring to FIG. 1 showing an odor pattern of an air conditioner, air conditioner odor is most strongly generated in an air conditioner-off period ((③)), for a predetermined time from an off time point), air conditioner odor is secondly strongly generated in a blower-on period ((①), and air conditioner odor is most weakly generated in an air conditioner-on period ((②).

Of course, depending on the state of air-conditioning systems, air conditioner odor may be most strongly generated in the blower-on period ((①) in some kinds of vehicles, air conditioner odor may be most strongly generated in the air conditioner-off period ((③) in some other kinds of vehicles, and air conditioner odor may be generated without a large difference in all of the blower-on period ((①), air conditioner-on period ((②), and the air conditioner-off period ((③).

In spite of various reasons of air conditioner odor described above, drivers and passengers may generally mistake that air conditioner odor is most strongly generated in the air conditioner-on period and there is a problem that they receive unnecessary examination and maintenance for an air conditioning system by mistaking unpleasant odor that is actually generated inside and outside a vehicle for air conditioner odor.

Accordingly, the present disclosure focuses on accurately measuring air conditioner odor that varies in each of operating modes of air conditioner such as a blower-on step, an air conditioner-on step, and an air conditioner-off step, and on enabling accurate examination and measures for an air-conditioning system on the basis of the measured result.

Figure 2:
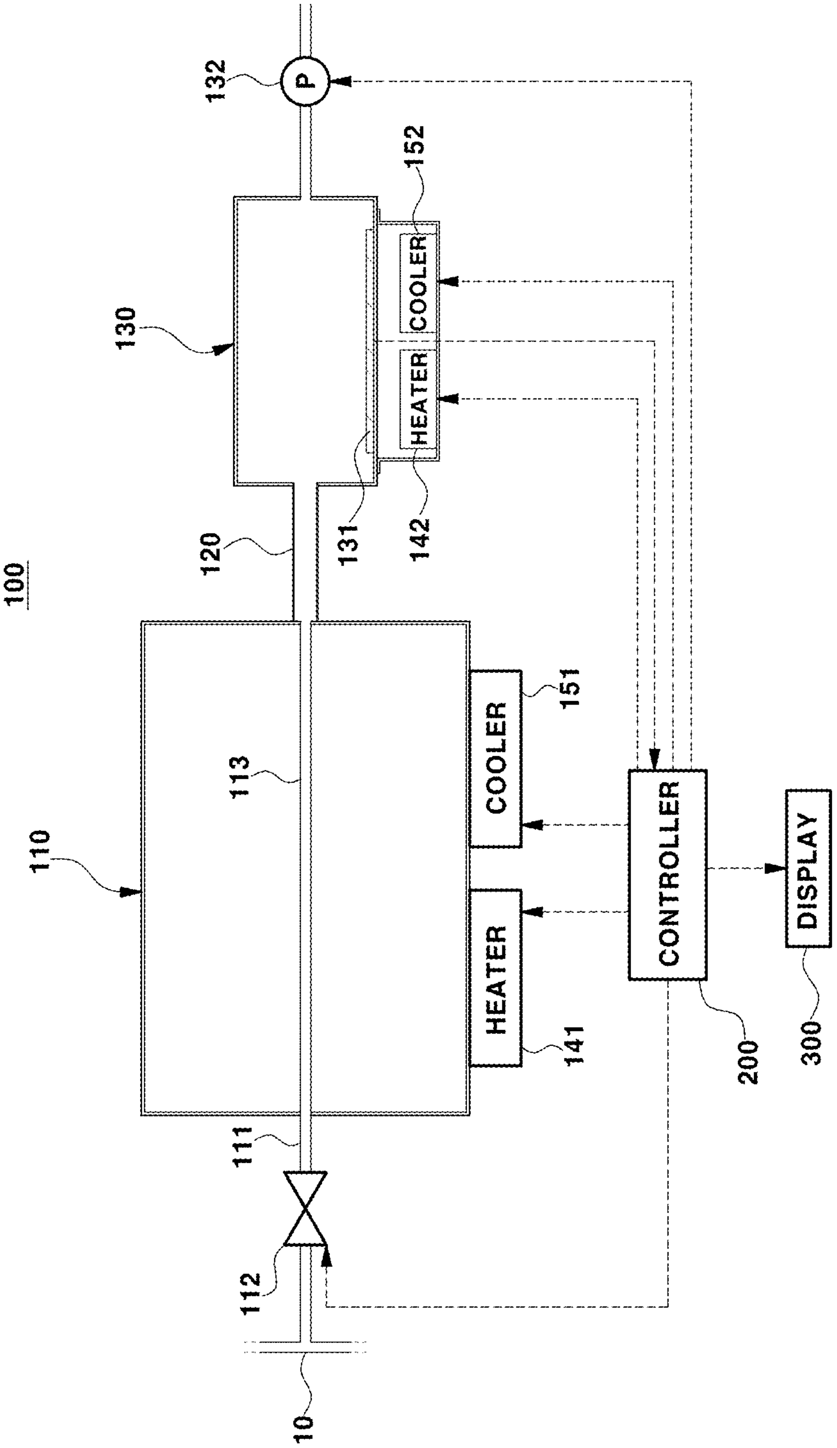
FIG. 2 is a schematic diagram showing a system for measuring odor from an air conditioner of a vehicle according to the present disclosure.

In the accompanying drawings, FIG. 2 is a schematic diagram showing a system for measuring odor from an air conditioner of a vehicle according to the present disclosure.

A system for measuring odor from an air conditioner according to the present disclosure includes an odor measurer 100, a controller 200, and a display 300.

The odor measurer 100 is connected to the duct 10 of an air-conditioning system and is configured to measure air conditioner odor that varies in each of the operation modes of an air conditioner.

The controller 200 is configured to compare the maximum concentration of air conditioner odor in each of the operation modes of an air conditioner with reference concentration on the basis of measurement signals (e.g., signals obtained by measuring air conditioner odor that varies in each of the operation modes of an air conditioner) of the odor measurer 100, and to determine different examination items of the air conditioner for each of the operation modes of the air conditioner when the maximum concentration of air conditioner odor in each of the operation modes of the air conditioner is over the reference concentration.

The display 300, which is mounted in the interior of a vehicle so that a driver, etc. can see it, displays examination items of an air conditioner determined by the controller 200 in response to control signals from the controller 200.

In the specification, the detailed configuration and operation of the odor measurer are described hereafter to help understand the present disclosure.

The odor measurer 100, as shown in FIG. 2, includes a pre-chamber 110 connected with the duct 10 of an air-conditioning system and an odor sensor chamber 130 connected with the pre-chamber 110 through a connecting pipe 120.

The pre-chamber 110 may be a box-type structure having a predetermined volume to adjust the temperature and humidity of the gas of an odor measurement target, that is, air that is supplied to an interior through the duct 10 of the air-conditioning system.

An air intake line 111 is connected between a first side of the pre-chamber 110 and the duct 10 of the air-conditioning system, whereby air that is the gas of an odor measurement target can be suctioned into the air intake line 111 from the duct 10.

A valve 112 that is opened and closed in accordance with control signals from the controller 200 is mounted at the inlet of the air intake line 111.

An air flow line 113 of which a first end is connected with the air intake line 111 and a second end is connected to a second side of the pre-chamber 110 is disposed across the inside of the pre-chamber 110.

The air flow line 113 is connected with the odor sensor chamber 130 through the connecting pipe 120.

An odor sensor 131 is mounted on the bottom inside the odor sensor chamber 130. The odor sensor 131 measures air conditioner odor from air that has sequentially passed through the air intake line 111, the air flow line 113, and the connecting pipe 120.

The odor sensor 131 attached to the bottom inside the odor sensor chamber 130 may be one of an electric-chemical odor sensor, an electric-chemical odor sensor array, a bio peptide-type sensor, a sensor using amino acid, and other kinds of odor sensors.

A suction pump 132 for suctioning air, which is the target for measuring air conditioner odor, into the odor sensor chamber 130 is connected to an outlet formed on a second side of the odor sensor chamber 130.

Accordingly, air that is an odor measurement target can be suctioned into the odor sensor chamber 130 sequentially through the air intake line 111, the air flow line 113, and the connecting pipe 120 by operation of the suction pump 132 and then can be discharged outside through the outlet of the odor sensor chamber 130 after the odor sensor 131 senses odor.

Accordingly, when air that flows through the duct 10 and is the target for measuring odor of an air conditioner is suctioned into the odor sensor chamber 130 sequentially through the air intake line 111, the air flow line 113, and the connecting pipe 120 by the operation of the suction pump 132, air conditioner odor can be measured from the air by the odor sensor 131 in the odor sensor chamber 130.

Meanwhile, when air conditioner odor is sensed from air flowing in the odor sensor chamber 130 by the odor sensor 131, odor data that is measured by the odor sensor may be changed, depending on the temperature and humidity of the air, and as a result, the accuracy in measurement of the odor sensor may be deteriorated. Accordingly, it is preferable to adjust the temperature and humidity of air that is sensed by the odor sensor 131 to predetermined levels.

To this end, the pre-chamber 110 is equipped with a first heater 141 that is controlled to be turned on/off by the controller 200 in order to heat the air passing through the air flow line 113 and a first cooler 151 that is controlled to be turned on/off by the controller 200 in order cool the air passing through the air flow line 113.

Therefore, when determining that the temperature of air passing through the air flow line 113 is less than a reference level or the humidity of the air is over a reference level on the basis of a detection signal from a temperature/humidity sensor (not shown), the controller 200 turns on the first heater 141 for heating. On the other hand, when determining that the temperature of air passing through the air flow line 113 is over the reference level or the humidity of the air is less than the reference level, the controller 200 turns on the first cooler 151 for cooling. Accordingly, the temperature and humidity of gas or air passing through the air flow line 114 in the pre-chamber 110 can be adjusted at predetermined levels.

The pre-chamber may be manufactured to have a volume that can transmit heat for heating or cold for cooling to the air passing through the air flow line 113.

In this case, even though the temperature and humidity of the air passing through the air flow line 113 is primarily adjusted by the first heater 141 or the first cooler 151, they may not be completely adjusted to predetermined levels.

Accordingly, a second heater 142 that is controlled to be turned on/off by the controller 200 in order to heat the inside of the odor sensor chamber 130 and a second cooler 152 that is controlled to be turned on/off by the controller 200 in order to cool the inside of the odor sensor chamber 130 may be further mounted at predetermined positions on the odor sensor chamber 130.

Accordingly, when air is supplied into the odor sensor chamber 130 after the temperature and humidity thereof are primarily adjusted through the air flow line 113 by the first heater 141 or the first cooler 151, the temperature and humidity of the air suctioned in the odor sensor chamber 130 are secondarily adjusted by heating of the second heater 142 or cooling of the second cooler 152, whereby the temperature and humidity of air that is the target for measuring air conditioner odor can be completely adjusted to predetermined levels, and accordingly, it is possible to ensure the accuracy in odor data that is measured by the odor sensor 131.

Meanwhile, when air that flows through the duct 10 of the air-conditioning system and is a target for measuring odor of an air conditioner is suctioned into the odor sensor chamber 130 sequentially through the air intake line 111, the air flow line 113, and the connecting pipe 120 by operation of the suction pump 132, it is possible to measure air conditioner odor from the air through the odor sensor 131 in the odor sensor chamber 130 and it is possible to measure air conditioner odor that varies in each of the operation modes of the air conditioner.

In detail, it is possible to measure air conditioner odor from air suctioned into the odor sensor chamber 130 for a predetermined time from the blower-on time point of an air conditioner using the odor sensor 131 and transmit an odor measurement signal to the controller 200, it is possible to measure air conditioner odor from air suctioned into the odor sensor chamber 130 for a predetermined time from the air conditioner-on time point and transmit an odor measurement signal to the controller 200, or it is possible to measure air conditioner odor from air suctioned into the odor sensor chamber 130 for a predetermined time from the air conditioner-off time point and transmit an odor measurement signal to the controller 200.

Accordingly, the controller 200 compares the maximum concentration of the air conditioner odor in each of the operation modes of the air conditioner with reference concentration on the basis of air conditioner odor measurement signals transmitted from the odor sensor 131 of the odor measurer 100, and determines different examination items of the air conditioner for each of the operation modes of the air conditioner when the maximum concentration of air conditioner odor in each of the operation modes of the air conditioner is over the reference concentration.

To this end, the controller 200 may be configured to determine first maximum concentration of air conditioner odor from an air conditioner odor measurement signal measured for a predetermined time from the blower-on time point by the odor sensor 131 of the odor measurer 100, and then compare the determined first maximum concentration with preset first reference concentration, and determine replacement of an air conditioner filter from the examination items of the air conditioner and control the display 300 to display notification for replacing the air conditioner filter when the first maximum concentration is over the first reference concentration.

The controller 200 may be configured to determine second maximum concentration of air conditioner odor from an air conditioner odor measurement signal measured for a predetermined time from the air conditioner-on time point by the odor sensor 131 of the odor measurer 100, and then compare the determined second maximum concentration with preset second reference concentration, and determine washing of an evaporator core from the examination items of the air conditioner and control the display 300 to display notification for washing the evaporator core when the second maximum concentration is over the second reference concentration.

The controller 200 may be configured to determine third maximum concentration of air conditioner odor from an air conditioner odor measurement signal measured for a predetermined time from the air conditioner-off time point by the odor sensor 131 of the odor measurer 100, and then compare the determined third maximum concentration with preset third reference concentration, and determine cleaning of an air conditioner duct and an interior from the examination items of the air conditioner and control the display 300 to display notification for cleaning the air conditioner duct and the interior when the third maximum concentration is over the third reference concentration.

Meanwhile, the first maximum concentration may be a concentration value when the derivative of air conditioner odor concentration (intensity) that is measured for a predetermined time from the blower-on time point by the odor sensor 131 is zero (0), the second maximum concentration may be a concentration value when the derivative of air conditioner odor concentration that is measured for a predetermined time from the air conditioner-on time point by the odor sensor 131 is zero (0), and the third maximum concentration may be a concentration value when the derivative of air conditioner odor concentration that is measured for a predetermined time from the air conditioner-off time point by the odor sensor 131 is zero (0).

A method for measuring odor from an air conditioner on the basis of the configuration described above according to an embodiment of the present disclosure is described hereafter.

Figure 3:
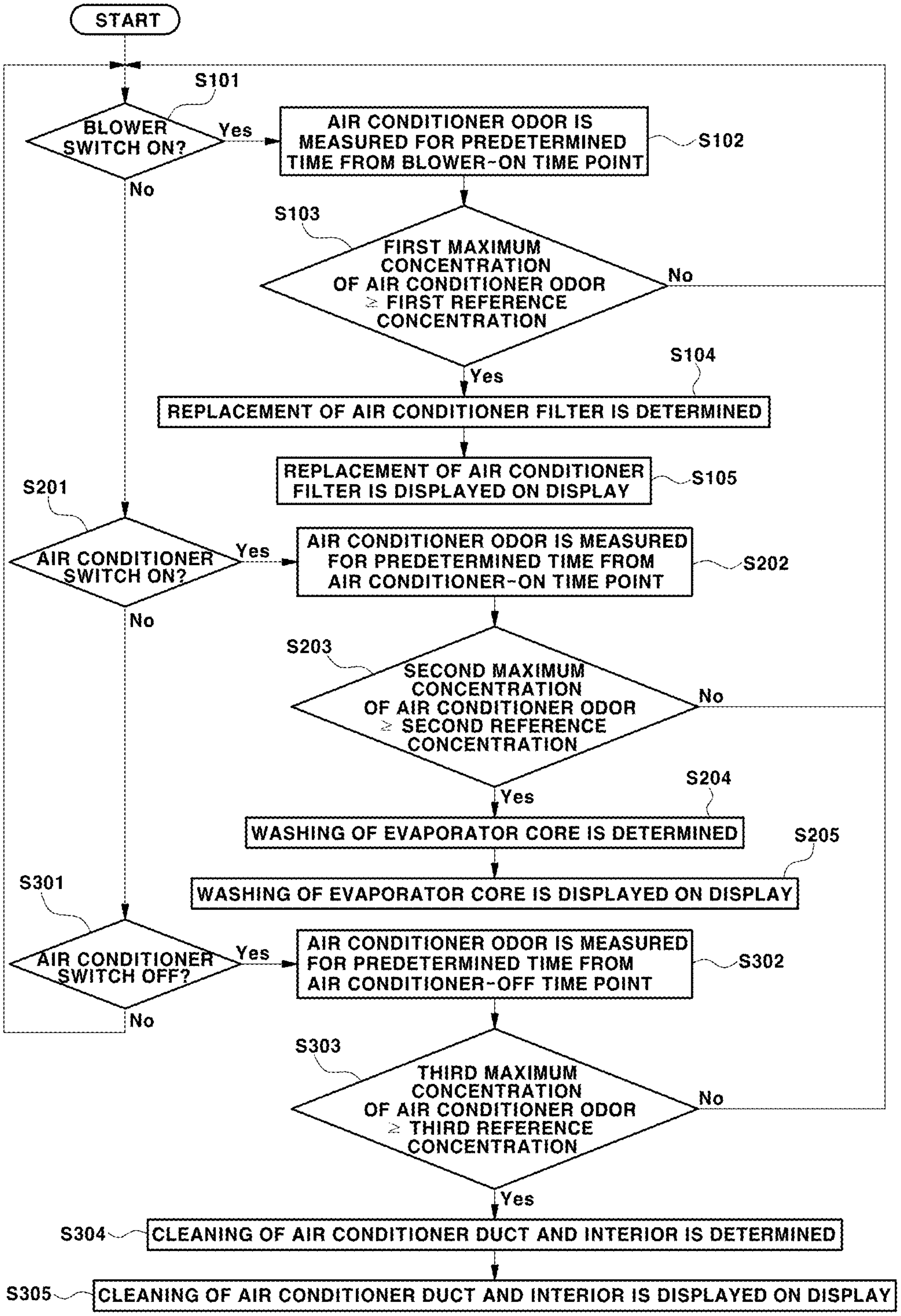
FIG. 3 is a flowchart showing a method for measuring odor from an air conditioner of a vehicle according to the present disclosure.

In the accompanying drawings, FIG. 3 is a flowchart showing a method for measuring odor from an air conditioner of a vehicle according to the present disclosure.

The odor measurer 100 connected to the duct 10 of an air-conditioning system measures air conditioner odor that varies in each of the operation modes of the air conditioner.

A step of measuring air conditioner odor through the odor measurer 100 includes a step of measuring air conditioner odor for a predetermined time from a blower-on time point, a step of measuring air conditioner odor for a predetermined time from an air conditioner-on time point, and a step of measuring air conditioner odor for a predetermined time from an air conditioner-off time point.

To this end, first, the controller 200 determines whether a blower switch has been turned on (S101).

When it is determined that the blower switch has been turned on, the valve 112 mounted at the inlet of the air intake line 111 is opened for a predetermined time and the suction pump 132 is operated in accordance with control signals from the controller 200.

Next, the step of measuring air conditioner odor through the odor measurer 100 proceeds for a predetermined time from the blower-on time point (S102).

Accordingly, as the blower is turned on, air that flows through the duct 10 of the air-conditioning system and is an odor measurement target can be suctioned into the odor sensor chamber 130 sequentially through the air intake line 111, the air flow line 113, and the connecting pipe 120 by the operation of the suction pump 132.

Further, air conditioner odor when the blower is turned on is measured from the air suctioned in the odor sensor chamber 130 by the odor sensor 131 and the measured odor measurement signal is transmitted to the controller 200.

Next, the controller 200 determines whether first maximum concentration of the air conditioner odor measured for a predetermined time from the blower-on time point is over first reference concentration (S103).

When the first maximum concentration of the air conditioner odor the blower turned on is over the first reference concentration, as the result of determination, the controller 200 determines replacement of an air conditioner filter from the examination items of the air conditioner (S104).

In detail, air conditioner odor that is produced when a blower is operated can be solve by only replacing an air conditioner filter, so when the first maximum concentration of air conditioner odor is over the first reference concentration, the controller 200 determines replacement of an air conditioner filter from the examination items of the air conditioner.

Next, notification for replacing the air conditioner filter can be displayed on the display 300 by control of the controller 200 (S105).

Accordingly, a driver or passenger can see the notification for replacing the air conditioner filter displayed on the display 300 and can replace the air conditioner filter to remove the air conditioner odor.

The controller 200 determines whether an air conditioner switch has been turned on (S201).

When it is determined that the air conditioner switch has been turned on, the valve 112 mounted at the inlet of the air intake line 111 is opened for a predetermined time and the suction pump 132 is operated in accordance with control signals from the controller 200.

Next, the step of measuring air conditioner odor through the odor measurer 100 proceeds for a predetermined time from the air conditioner-on time point (S202).

Accordingly, as the air conditioner is turned on, air that flows through the duct 10 of the air-conditioning system and is an odor measurement target can be suctioned into the odor sensor chamber 130 sequentially through the air intake line 111, the air flow line 113, and the connecting pipe 120 by the operation of the suction pump 132.

Further, air conditioner odor when the air conditioner is turned on is measured from the air suctioned in the odor sensor chamber 130 by the odor sensor 131 and the measured odor measurement signal is transmitted to the controller 200.

Next, the controller 200 determines whether second maximum concentration of the air conditioner odor measured for a predetermined time from the air conditioner-on time point is over second reference concentration (S203).

When the second maximum concentration of the air conditioner odor with the air conditioner turned on is over the second reference concentration, as the result of determination, the controller 200 determines washing of an evaporator core from the examination items of the air conditioner (S204).

In detail, air conditioner odor that is produced when an air conditioner is operated cannot be solve through only replacement of an air conditioner filter and the reason is propagation of mold, etc. due to condensate at the evaporator core, so when the second maximum concentration of air conditioner odor is over the second reference concentration, the controller 200 determines washing of an evaporator core from the examination items of the air conditioner.

Further, notification for washing the evaporator core can be displayed on the display 300 by control of the controller 200 (S205).

Accordingly, a driver or passenger can see the notification for washing the evaporator core displayed on the display 300 and wash the evaporator core to remove the air conditioner odor.

The controller 200 determines whether an air conditioner switch has been turned off (S301).

When it is determined that the air conditioner switch has been turned off, the valve 112 mounted at the inlet of the air intake line 111 is opened for a predetermined time and the suction pump 132 is operated in accordance with control signals from the controller 200.

Next, the step of measuring air conditioner odor through the odor measurer 100 proceeds for a predetermined time from the air conditioner-off time point (S302).

In this case, even though the air conditioner is turned off, the blower keeps operating for a predetermined time for drying of the evaporator core, etc.

Accordingly, as the air conditioner is turned off, air that flows through the duct 10 of the air-conditioning system and is an odor measurement target can be suctioned into the odor sensor chamber 130 sequentially through the air intake line 111, the air flow line 113, and the connecting pipe 120 by the operation of the suction pump 132.

Further, air conditioner odor when the air conditioner is turned off is measured from the air suctioned in the odor sensor chamber 130 by the odor sensor 131 and the measured odor measurement signal is transmitted to the controller 200.

Next, the controller 200 determines whether third maximum concentration of the air conditioner odor measured for a predetermined time from the air conditioner-off time point is over third reference concentration (S303).

When the third maximum concentration of the air conditioner odor with the air conditioner turned off is over the third reference concentration, as the result of determination, the controller 200 determines cleaning of an air conditioner duct and an interior from the examination items of the air conditioner (S204).

In detail, air conditioner odor that is produced when an air conditioner is turned off may be caused by contamination of the inside and outside of an air vent for discharging air to an interior, including the duct, so when third maximum concentration is over the third reference concentration, the controller 200 determines cleaning of an air conditioner duct and an interior from the examination items of the air conditioner.

Next, notification for cleaning the air conditioner duct and the interior can be displayed on the display 300 by control of the controller 200 (S305).

Accordingly, a driver or passenger can see the cleaning of air conditioner duct and interior displayed on the display 300 and can clean the inside and outside of an air vent for discharging air to an interior, including the duct, to remove the air conditioner odor.

As described above, it is possible to accurately examine an air-conditioning system and take measures on the basis of a measurement result by measuring air conditioner odor in each of the operation modes of the air conditioner including a blower-on step, an air conditioner-on step, and an air conditioner-off step, etc., and accordingly, it is possible to prevent unnecessary and inaccurate examination and maintenance of an air-conditioning system that is performed in the related art.

Although the present disclosure was described above in detail through one embodiment, the scope of the present disclosure is not limited to the embodiment, and various changes and modifications by those skilled in the art using the spirit of the present disclosure defined in the following claims are also included in the scope of the present disclosure.

The invention claimed is:

1. A system for measuring odor from an air conditioner of a vehicle, the system comprising:

an odor measurer connected to an air-conditioning system and configured to measure air conditioner odor in each operation mode of the air conditioner, the odor measurer comprising an odor sensor chamber, a valve configured to be opened and closed in accordance with control signals from the controller, and a suction pump configured to suction air into the odor sensor chamber;

a controller configured to control the valve and the suction pump to measure the air conditioner odor according to the operation mode of the air conditioner, compare a maximum concentration of air conditioner odor in each of the operation modes of the air conditioner with a reference concentration based on measurement signals of the odor measurer, and to determine different examination items of the air conditioner for each of the operation modes of the air conditioner when the maximum concentration of air conditioner odor in each of the operation modes of the air conditioner is over the reference concentration; and a display configured to display examination items of the air conditioner determined by the controller.

2. The system of claim 1, wherein the controller is configured to compare a first maximum concentration of air conditioner odor measured for a predetermined time from a blower-on time point by the odor measurer with a first reference concentration, and to determine replacement of an air conditioner filter from the examination items of the air conditioner, and to control the display to display a notification for replacing the air conditioner filter when the first maximum concentration is above the first reference concentration.

3. The system of claim 1, wherein the controller is configured to compare a second maximum concentration of air conditioner odor measured for a predetermined time from an air conditioner-on time point by the odor measurer with a second reference concentration, and to determine washing of an evaporator core from the examination items of the air conditioner, and to control the display to display a notification for washing the evaporator core when the second maximum concentration is above the second reference concentration.

4. The system of claim 1, wherein the controller is configured to compare a third maximum concentration of air conditioner odor measured for a predetermined time from an air conditioner-off time point by the odor measurer with a third reference concentration, and to determine cleaning of an air conditioner duct and an interior from the examination items of the air conditioner, and to control the display to display a notification for cleaning the air conditioner duct and the interior when the third maximum concentration is above the third reference concentration.

5. The system of claim 1, wherein the odor measurer comprises:

a pre-chamber;

an air intake line connected between a first side of the pre-chamber and a duct;

an air flow line having a first end connected with the air intake line and a second end connected to a second side of the pre-chamber, and disposed across an inside of the pre-chamber;

the valve being mounted on the air intake line and configured to be opened and closed;

an odor sensor mounted in the odor sensor chamber and configured to measure air conditioner odor that is suctioned through the air intake line and the air flow line;

a connecting pipe connected between an inlet of the odor sensor chamber and the air flow line; and the suction pump being connected to an outlet pipe of the odor sensor chamber.

6. The system of claim 5, wherein the pre-chamber is equipped with a first heater configured to be turned on or off by the controller to heat air passing through the air flow line, and a first cooler configured to be turned on or off by the controller to cool the air passing through the air flow line.

7. The system of claim 5, wherein the odor sensor chamber is equipped with a second heater configured to be turned on or off by the controller to heat an inside of the odor sensor chamber, and a second cooler configured to be turned on or off by the controller to cool an inside of the odor sensor chamber.

8. A system for measuring odor from an air conditioner of a vehicle, the system comprising:

an odor measurer comprising a pre-chamber, an air intake line connected between a first side of the pre-chamber and a duct, an air flow line having a first end connected with the air intake line and a second end connected to a second side of the pre-chamber, and disposed across an inside of the pre-chamber, a valve mounted on the air intake line and configured to be opened and closed in accordance with control signals from a controller, an odor sensor mounted in an odor sensor chamber and configured to measure air conditioner odor that is suctioned through the air intake line and the air flow line, a connecting pipe connected between an inlet of the odor sensor chamber and the air flow line, and a suction pump connected to an outlet pipe of the odor sensor chamber; and a controller configured to open the valve to enable odor concentration to be measured by the odor sensor for a predetermined time from an on or off time point of an air conditioner switch, to calculate maximum concentration from the measured odor concentration, and to determine an examination item of the air conditioner when the calculated maximum concentration is over reference concentration by comparing the maximum concentration with the reference concentration.

9. A method for measuring odor from an air conditioner of a vehicle, the method comprising:

measuring air conditioner odor in each operation mode of the air conditioner by an odor measurer connected to a duct of an air-conditioning system, wherein the measuring comprises opening a valve and driving a suction pump by a controller to suction air into an odor sensor chamber of the odor measurer;

comparing a maximum concentration of the air conditioner odor in each of the operation modes of the air conditioner with a reference concentration based on measurement signals of the odor measurer by a controller;

determining different examination items of the air conditioner for each of the operation modes of the air conditioner by the controller when the maximum concentration of air conditioner odor in each of the operation modes of the air conditioner is above the reference concentration; and displaying, on a display, determined examination items of the air conditioner by control of the controller.

10. The method of claim 9, wherein measuring air conditioner odor comprises measuring air conditioner odor for a predetermined time from a blower-on time point, measuring air conditioner odor for a predetermined time from an air conditioner-on time point, and measuring air conditioner odor for a predetermined time from an air conditioner-off time point.

11. The method of claim 9, wherein, in the determining of examination items of the air conditioner, when a first maximum concentration of air conditioner odor measured for a predetermined time from a blower-on time point by the odor measurer is above a first reference concentration, the controller determines replacement of an air conditioner filter from the examination items of the air conditioner.

12. The method of claim 11, wherein a notification for replacing the air conditioner filter is displayed on the display by control of the controller.

13. The method of claim 9, wherein, in the determining of examination items of the air conditioner, when a second maximum concentration of air conditioner odor measured for a predetermined time from an air conditioner-on time point by the odor measurer is above a second reference concentration, the controller determines washing of an evaporator core from the examination items of the air conditioner.

14. The method of claim 13, wherein a notification for washing the evaporator core is displayed on the display by control of the controller.

15. The method of claim 9, wherein, in the determining of examination items of the air conditioner, when a third maximum concentration of air conditioner odor measured for a predetermined time from an air conditioner-off time point by the odor measurer is above a third reference concentration, the controller determines cleaning of an air conditioner duct and an interior from the examination items of the air conditioner.

16. The method of claim 15, wherein a notification for cleaning the air conditioner duct and the interior is displayed on the display by control of the controller.

* * * * *